United States Patent
Popescu et al.

(10) Patent No.: US 7,707,890 B2
(45) Date of Patent: *May 4, 2010

(54) ACOUSTIC SENSOR FOR PROACTIVE FAULT MONITORING IN COMPUTER SYSTEMS

(75) Inventors: George Popescu, Cincinnati, OH (US); Kenny C. Gross, San Diego, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 11/827,353

(22) Filed: Jul. 10, 2007

(65) Prior Publication Data

US 2009/0013789 A1    Jan. 15, 2009

(51) Int. Cl.
*G01H 11/00* (2006.01)
(52) U.S. Cl. .......................... 73/660; 73/661
(58) Field of Classification Search ............ 73/596, 73/587, 632, 660, 661
See application file for complete search history.

(56) References Cited

U.S. PATENT DOCUMENTS

| | | | | |
|---|---|---|---|---|
| 4,998,022 A * | 3/1991 | Tregay | ................... | 250/577 |
| 6,513,386 B2 * | 2/2003 | Barclay et al. | ............... | 73/649 |
| 6,523,413 B1 * | 2/2003 | Hoshino et al. | ............... | 73/660 |
| 7,271,706 B2 * | 9/2007 | Lee | ................... | 340/384.2 |
| 7,286,964 B2 * | 10/2007 | Kim | ................... | 702/183 |
| 7,322,244 B2 * | 1/2008 | Kim | ................... | 73/587 |
| 7,387,033 B2 * | 6/2008 | Qing et al. | ............ | 73/862.046 |
| 7,395,189 B2 * | 7/2008 | Qing et al. | ............... | 702/185 |
| 7,413,919 B2 * | 8/2008 | Qing et al. | ............... | 438/48 |
| 2006/0212755 A1 * | 9/2006 | Urmanov et al. | ............... | 714/25 |
| 2008/0105056 A1 * | 5/2008 | Popescu et al. | ............... | 73/649 |

* cited by examiner

*Primary Examiner*—J M Saint Surin
(74) *Attorney, Agent, or Firm*—Park, Vaughan & Fleming LLP; Anthony P. Jones

(57) ABSTRACT

Embodiments of the present invention provide a system for detecting vibrations from a component. The system operates by coupling vibrations from a component to a membrane using a flexible connecting line. The membrane converts the vibrations into acoustic waves that are transmitted through a medium. Finally, a microphone detects the acoustic waves in the medium and converts the acoustic waves into electrical signals.

20 Claims, 5 Drawing Sheets

ACOUSTIC SENSOR FOR PROACTIVE FAULT MONITORING IN COMPUTER SYSTEMS

COLOR DRAWINGS

The patent or application file contains at least one drawing executed in color. Copies of this patent or patent application publication with color drawing(s) will be provided by the Office upon request and payment of the necessary fee.

RELATED APPLICATIONS

This application is related to a pending U.S. patent application, entitled "Method and Apparatus for Detecting the Onset of Hard Disk Failures," by inventors Aleksey M. Urmanov and Kenny C. Gross, having Ser. No. 11/205,472, which was filed 16 Aug. 2005. This application is also related to a pending U.S. patent application entitled "Method and Apparatus for Detecting Vibrations from a Mechanical Component," by inventors George Popescu, Kenny C. Gross, and Aleksey M. Urmanov, having Ser. No. 11/593,743, which was filed 6 Nov. 2006. The above-listed applications are hereby incorporated by reference.

BACKGROUND

1. Field of the Invention

Embodiments of the present invention relate to techniques for performing reliability tests on computer systems. More specifically, embodiments of the present invention relate to a method and an apparatus for monitoring vibrations to facilitate reliability studies on a computer system.

2. Related Art

Enterprise computer systems often include a large number of hard disk drives. For example, a single server system can sometimes include as many as 15,000 hard disk drives. Losing the data which is stored on these disk drives can have a devastating effect on an organization. For example, airlines rely on the integrity of data stored in their reservation systems for most of their day-to-day operations, and would essentially cease to function if this data became lost or corrupted. If fault-prone hard disk drives can be identified before they fail, preventative measures can be taken to avoid such failures.

Existing techniques for identifying hard disk drives that are likely to fail have many drawbacks. One technique analyzes internal counter-type variables, such as read retries, write retries, seek errors, dwell time (time between reads/writes) to determine whether a disk drive is likely to fail. Unfortunately, in practice, this technique suffers from a high missed-alarm probability (MAP) of about 50%, and a false-alarm probability (FAP) of about 1%. This high MAP increases the probability of massive data loss, and the FAP causes a large number of drives to be returned for which there is No-Trouble-Found (NTF), resulting in increased warranty costs.

Another technique monitors internal discrete performance metrics within disk drives, for example, by monitoring internal diagnostic counter-type variables called "SMART variables." However, hard disk drive manufacturers are reluctant to add extra diagnostics to monitor these variables, because doing so increases the costs. Furthermore, in practice, this technique fails to identify approximately 50% of imminent hard disk drive failures.

To prevent catastrophic data loss due to hard disk failures, systems often use redundant arrays of inexpensive disks (RAID) to provide fault tolerance. Unfortunately, because the capacity of hard disk drives has increased dramatically in recent years, the time required to rebuild a RAID array after a failure of one of the disks has also increased dramatically. Consequently, the rebuilding process can take many hours to several days, during which time the system is susceptible to a second hard disk drive failure which would cause massive data loss.

During operation, a disk drive produces vibrations (and/or acoustic signatures) which can contain important diagnostic information (e.g., frequency, amplitude, and phase) related to the health of the disk drive. For example, the vibration information for hard disk drives can indicate whether a spindle assembly is failing. Furthermore, vibration signatures are typically unique for different failure modes. For example, ball bearing imperfections have a unique frequency related to the spindle rotational frequency. This vibration information is useful for predicting hard disk drive failures. Hence, accelerometers or microphones can be used to acquire vibration or acoustic signatures from hard disk drives. Unfortunately, accelerometers are too complicated and expensive to deploy across large systems. On the other hand, microphones are cheaper, but they pick up external sounds (e.g., human voices) which are not related to the hard disk drives being monitored, and the recording of these external sounds is highly undesirable for security and privacy reasons.

Hence, what is needed is a method and an apparatus for detecting vibrations without the above-described problems.

SUMMARY

Embodiments of the present invention provide a system for detecting vibrations from a component. The system operates by coupling vibrations from a component to a membrane using a flexible connecting line. The membrane converts the vibrations into acoustic waves that are transmitted through a medium. Finally, a microphone detects the acoustic waves in the medium and converts the acoustic waves into electrical signals.

In some embodiments, the system couples vibrations from multiple components to the membrane using a separate flexible connecting line for each component.

In some embodiments, each connecting line has different mechanical coupling properties so that the membrane can convert the vibrations from the corresponding component into separately identifiable acoustic waves.

In some embodiments, the connecting line is bent and/or curved while the connecting line is routed between the component and the membrane.

In some embodiments, the connecting line is rerouted if an object is placed in the route of the connecting line.

In some embodiments, the medium includes air.

In some embodiments, the membrane, the microphone, and the medium are enclosed in an acoustically insulated enclosure. The acoustically insulated enclosure prevents external acoustic sources from being detected by the microphone.

In some embodiments, the system uses a data acquisition system which is coupled to the microphone to analyze the electrical signals to determine the health of the component, wherein the electrical signals generated by the microphone are received by the data acquisition system.

In some embodiments, the component can include: (1) a hard disk drive; (2) a chassis fan; (3) a power supply fan; (4) a processor fan; or (5) any other device that produces vibrations during normal operation.

In some embodiments, the system adjusts a physical property of the membrane to adjust an amplitude of the acoustic waves generated by the membrane.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Some embodiments of the present invention provide a mechanism to detect vibration signatures for a component. This component can include: a hard disk drive, a chassis fan, a power supply fan, a processor fan, or any other device that produces vibrations during operation.

Some embodiments of the present invention detect vibrations and convert the vibrations into electrical signals which can be recorded and analyzed by a diagnostic system to evaluate the current state or health of the component and to determine the "remaining useful life" of the component.

Some embodiments of the present invention use the vibration signatures to provide early notification of the onset of failure in the component. For example, a hard disk drive failure may be caused by degradation in spindle bearings or spindle motors of a hard disk drive. Hence, these embodiments provide early notification of the onset of degradation for a hard disk drive so that the hard disk drive can be replaced before failure occurs.

Some embodiments of the present invention isolate the vibrations produced by a component so that other vibrations and acoustic waves are not detected.

Computer System

Figure 1:
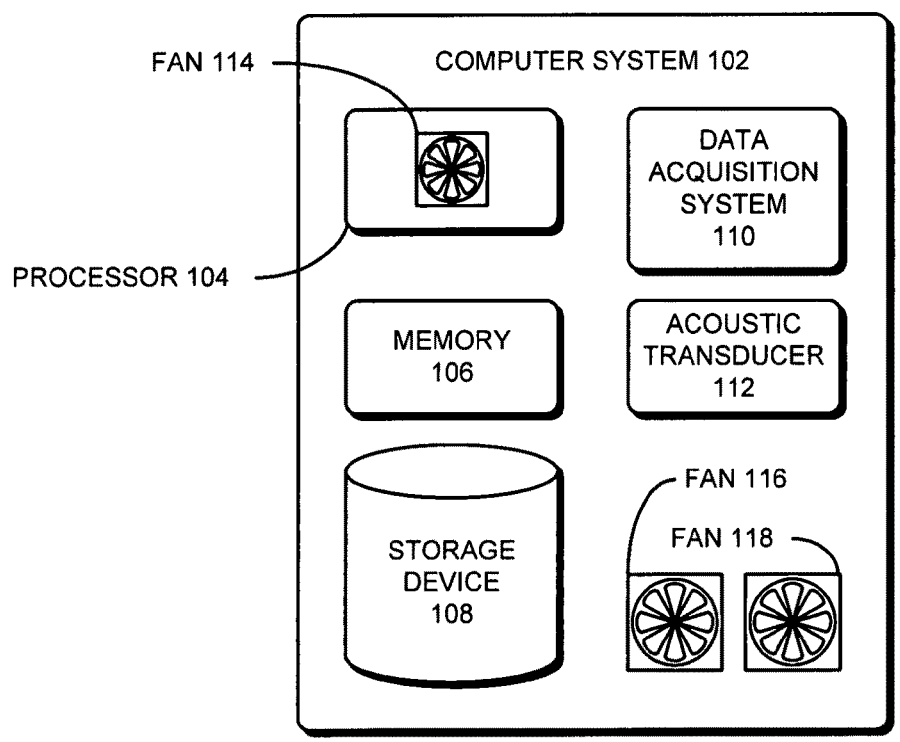
FIG. 1 illustrates a computer system in accordance with an embodiment of the present invention.

FIG. 1 illustrates a computer system 102 in accordance with embodiments of the present invention. Computer system 102 includes processor 104, memory 106, storage device 108, data acquisition system 110, and acoustic transducer 112. Fan 114 provides cooling to processor 104, and fans 116 and 118 provide cooling to the chassis for computer system 102.

Although we use computer system 102 for the purposes of illustration, embodiments of the present invention can be applied to other systems, such as desktop computers, workstations, embedded computer systems, laptop computer systems, servers, networking components, peripheral cards, handheld computing devices, automated manufacturing systems, and many other computer systems.

Processor 104 can generally include any type of processor, including, but not limited to, a microprocessor, a device controller, or a computational engine within an appliance.

Memory 106 can include any type of memory, including, but not limited to, dynamic random access memory (DRAM), static random access memory (SRAM), flash memory, and read only memory (ROM). Storage device 108 can include any type of non-volatile storage device that can be coupled to a computer system, including, but not limited to, magnetic, optical, and magneto-optical storage devices, solid-state storage devices, and/or battery-backed up memory.

In some embodiments of the present invention, data acquisition system 110 is separate from computer system 102. For example, data acquisition system 110 can be a standalone system or can be part of another computer system.

In some embodiments of the present invention, acoustic transducer 112 is coupled to a component within computer system 102. For example, acoustic transducer 112 can be coupled to storage device 108 or to fans 114-118. In other embodiments of the present invention, a separate acoustic transducer 112 is provided for each component within computer system 102. In yet other embodiments of the present invention, a separate acoustic transducer 112 is used for each component in a subset of components within computer system 102.

In some embodiments of the present invention, one acoustic transducer 112 is coupled to multiple components in computer system 102. For example one acoustic transducer 112 can be coupled to storage device 108, fans 116-118, and fan 114 simultaneously.

In these embodiments, the multiple components can be coupled to acoustic transducer 112 using connecting lines with differing vibration transfer properties so that the vibrations from each component can be uniquely identified when acoustic transducer 112 is coupled to multiple components and receives transmitted vibrations from more than one of the components simultaneously. Note that the components can be coupled to acoustic transducer 112 using connecting lines of different size, manufacturing material, or tension.

In some embodiments of the present invention, acoustic transducer 112 is coupled to data acquisition system 110, which analyzes the electrical signals sent from acoustic transducer 112 and determines the health of the component.

Acoustic Transducer

Figure 2A:
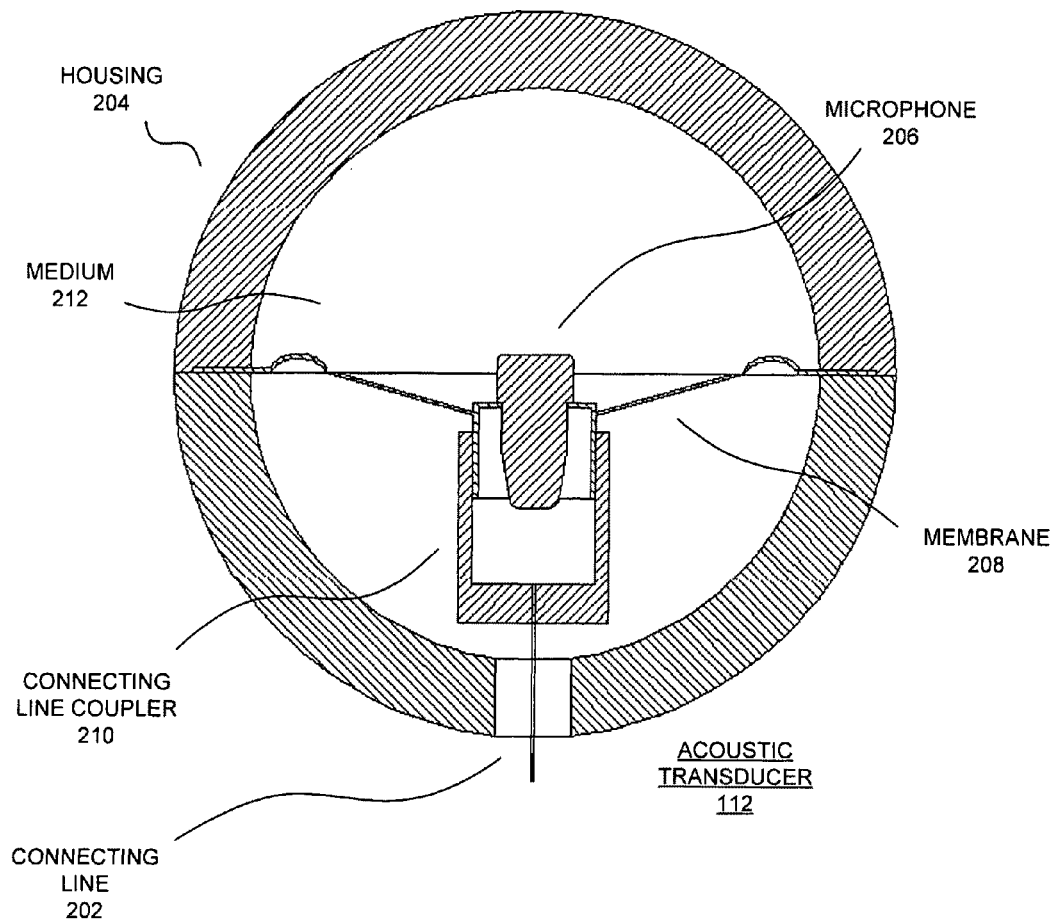
FIG. 2A illustrates an acoustic transducer in accordance with an embodiment of the present invention.
Figure 2B:
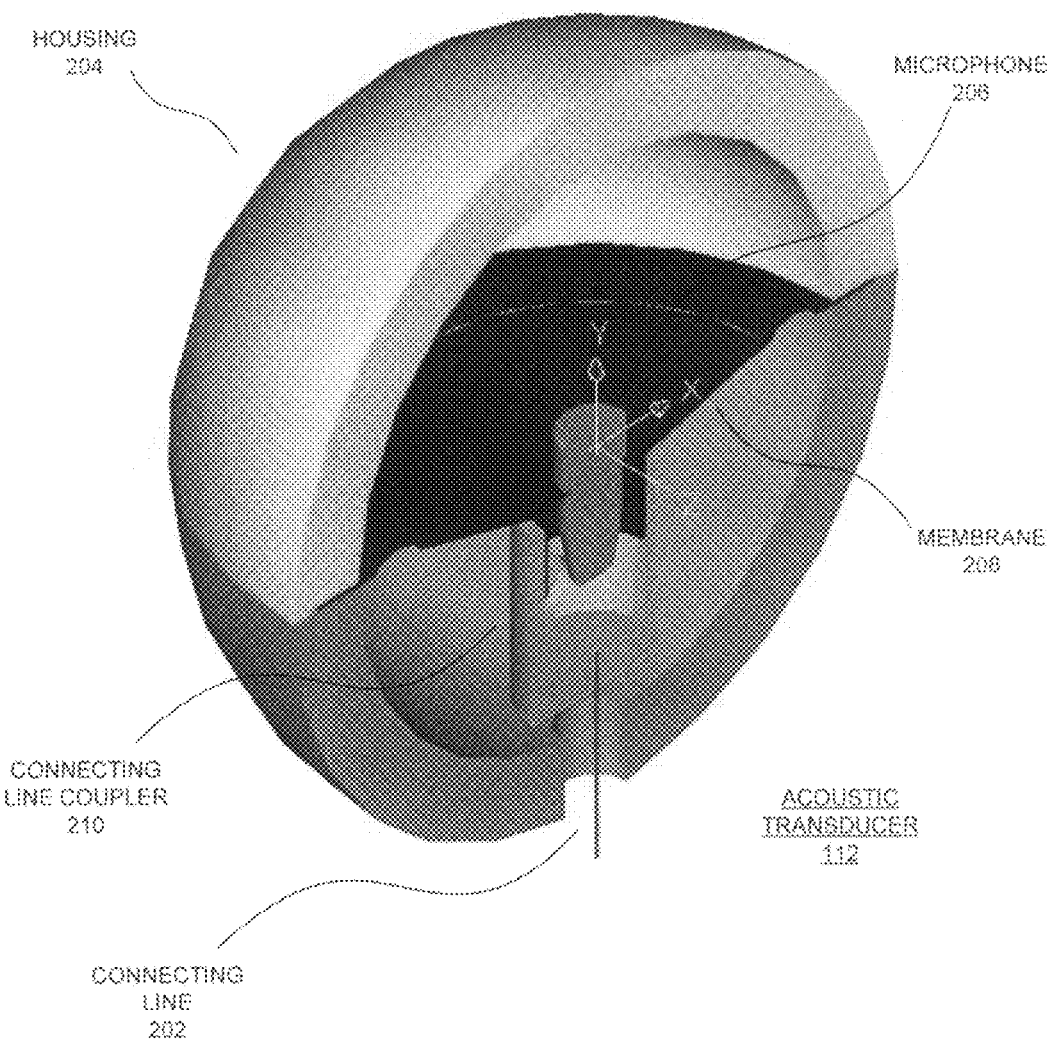
FIG. 2B illustrates another view of the acoustic transducer presented in FIG. 2A in accordance with an embodiment of the present invention.

FIGS. 2A and 2B present two-dimensional and three-dimensional views of acoustic transducer 112 in accordance with embodiments of the present invention. Referring to FIGS. 2A and 2B, acoustic transducer 112 includes connecting line 202, connecting line coupler 210, microphone 206, and membrane 208.

In some embodiments of the present invention, connecting line 202 can be coupled to a component under test. In these embodiments, vibrations from the component are transferred through connecting line 202 to connecting line coupler 210, which in turn transfers the vibrations to membrane 208. Membrane 208 converts the vibrations into acoustic waves that are transmitted through medium 212.

In some embodiments of the present invention, the amplitude of the acoustic waves generated by membrane 208 can be adjusted by adjusting physical properties of membrane 208. For example, the physical properties that can be adjusted include, but are not limited to: the material used for membrane 208, the thickness of membrane 208, the area of membrane 208, or the tension on membrane 208.

In some embodiments of the present invention, medium 212 is air. In other embodiments, medium 212 can be a liquid, a gas, or a solid. Microphone 206 detects the acoustic waves in medium 212 and converts the acoustic waves into electrical signals. In some embodiments of the present invention, the electrical signals are transmitted to data acquisition system 110.

In some embodiments of the present invention, housing 204 insulates membrane 208, microphone 206, and medium 212 from external vibrations and acoustic sources. (i.e., housing 204 prevents microphone 206 from picking up external sounds or vibrations, such as human voices.)

In some embodiments of the present invention, connecting line 202 is tensioned in order to facilitate the transfer of vibrations from the component under test to acoustic transducer 112. In these embodiments, connecting line 202 is formed of a material or combination of materials that maintain tension, such as Kevlar, Aramid, steel, or another material or combination of materials.

In some embodiments of the present invention, connecting line 202 can be curved and/or bent one or more times between the component under test and acoustic transducer 112. For example, connecting line 202 can be curved and/or bent in order to be routed around one or more objects. Consequently, acoustic transducer 112 can be placed in locations where connecting line 202 is routed around one or more objects in order to couple the component under test with acoustic transducer 112. In these embodiments, connecting line 202 can be re-routed if a new object is placed in computer system 102 or if the component under test or acoustic transducer 112 is moved.

Figure 3:
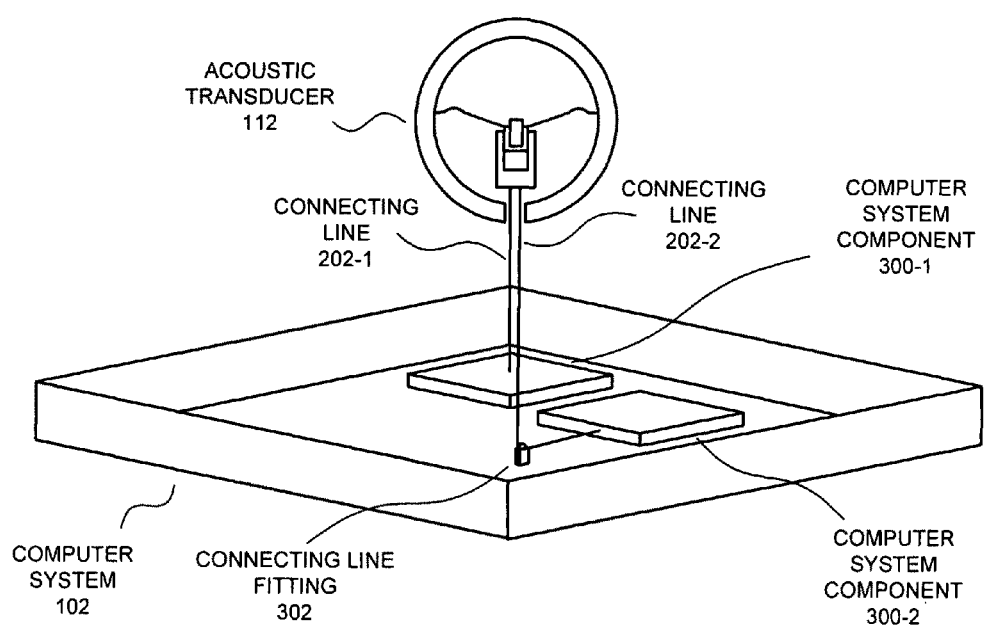
FIG. 3 illustrates an acoustic transducer coupled to computer system components in accordance with embodiments of the present invention.

FIG. 3 illustrates an acoustic transducer 112 coupled to computer system components 300-1 and 300-2 in accordance with embodiments of the present invention. (Note that acoustic transducer 112 is shown in a cut-away view to illustrate the coupling of multiple connecting lines 202 to connecting line coupler 210.) As shown in FIG. 3, connecting line 202-1 is coupled in a straight line between acoustic transducer 112 and computer system component 300-1.

Connecting line 202-2 is coupled between computer system component 300-2 and acoustic transducer 112. However, unlike connecting line 202-1, which is a straight line, connecting line 202-2 is routed through connecting line fitting 302 between computer system component 300-2 and acoustic transducer 112. Connecting line fitting 302 is an exemplary fitting that directs connecting line 202 between the component under test and the acoustic transducer 112. By using fittings such as connecting line fitting 302, acoustic transducer 112 can be placed in locations that cannot be reached using straight connecting lines 202.

Detecting Vibrations

Figure 4:
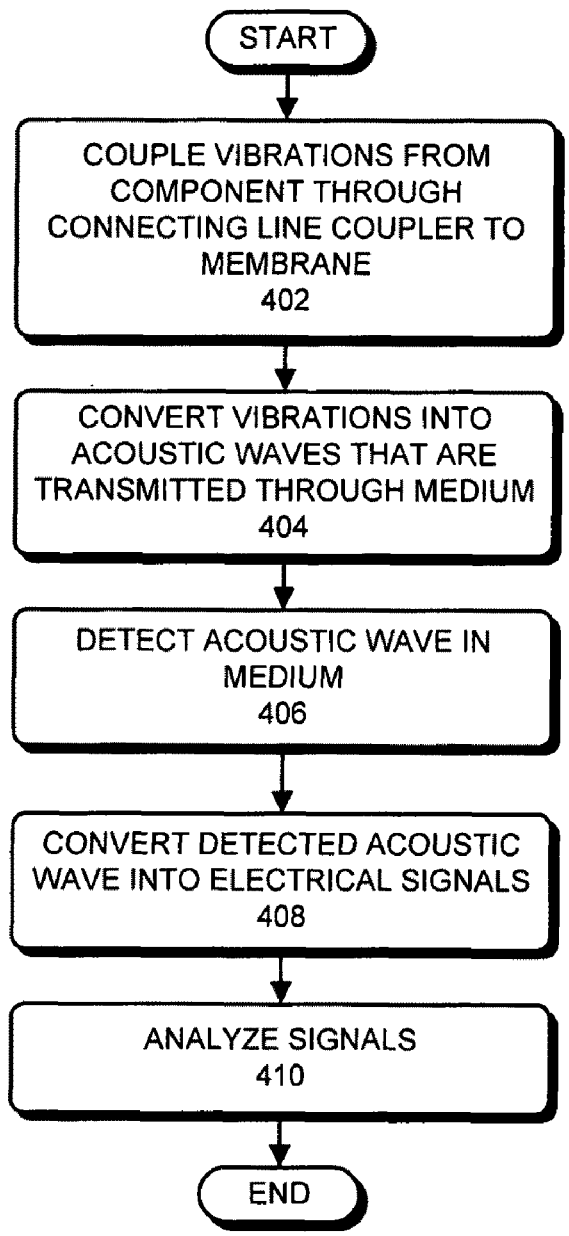
FIG. 4 presents a flowchart illustrating the process of detecting vibrations in accordance with an embodiment of the present invention.

FIG. 4 presents a flowchart illustrating the process of detecting vibrations in accordance with embodiments of the present invention. The process starts when the system uses a connecting line 202 to couple vibrations from a component through connecting line coupler 210 and to membrane 208 (step 402). Next, the system uses membrane 208 to convert the vibrations into acoustic waves that are transmitted through medium 212 (step 404). The system then uses microphone 206 to detect the acoustic waves in medium 212 (step 406) and to convert the acoustic waves into electrical signals (step 408). Next, the system uses data acquisition system 110 to determine the health of the component by analyzing the electrical signals (step 410).

Detecting the Onset of Component Failures

Some embodiments of the present invention determine whether components have degraded by analyzing the vibration signature of the component. In these embodiments, data acquisition system 110 includes a reference vibration signature, which can be compared with the current vibration signature to determine if the component has degraded. The process of analyzing the vibration signatures of components is described in more detail in a pending U.S. patent application entitled "Method and Apparatus for Detecting Vibrations from a Mechanical Component," having Ser. No. 11/593,743 and a filing date of Nov. 6, 2006, by inventors George Popescu, Kenny C. Gross, and Aleksey M. Urmanov.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that detects vibrations from a component, comprising:
   a connecting line coupled to the component, wherein the connecting line is flexible;
   a membrane;
   a connecting line coupler configured to couple the connecting line to the membrane, so that vibrations from the component are mechanically transferred through the connecting line and the connecting line coupler to the membrane, wherein the membrane converts the vibrations into acoustic waves that are transmitted through a medium; and
   a microphone which detects the acoustic waves in the medium and which converts the acoustic waves into electrical signals.

2. The apparatus of claim 1, further comprising:
   multiple connecting lines separately coupled to multiple components, wherein each connecting line is flexible;
   wherein the connecting line coupler couples the multiple connecting lines to the membrane, so that vibrations from the multiple components are mechanically transferred through the corresponding connecting line and the connecting line coupler to the membrane, wherein the membrane converts the vibrations into acoustic waves that are transmitted through the medium.

3. The apparatus of claim 2, wherein each of the multiple connecting lines has different mechanical coupling properties to facilitate converting the vibrations from the corresponding component into separately identifiable acoustic waves.

4. The apparatus of claim 2, wherein the connecting line is bent and/or curved as the connecting line is routed between the component and the connecting line coupler.

5. The apparatus of claim 4, wherein a connecting line is rerouted if an object is placed in the route of the connecting line.

6. The apparatus of claim 1, wherein the medium includes air.

7. The apparatus of claim 1, further comprising an acoustically insulated enclosure which encloses the membrane, the microphone, and the medium, wherein the acoustically insulated enclosure prevents external acoustic sources from being detected by the microphone.

8. The apparatus of claim 1, further comprising a data acquisition system which is coupled to the microphone, wherein the electrical signals generated by the microphone are received by the data acquisition system, and wherein the data acquisition system analyzes the electrical signals to determine the health of the component.

9. The apparatus of claim 1, wherein the component includes at least one of:
   a hard disk drive;

a chassis fan;

a power supply fan;

a processor fan; or any other device that produces vibrations during normal operation.

10. The apparatus of claim 1, wherein the amplitude of the acoustic waves generated by the membrane is adjusted by adjusting physical properties of the membrane.

11. A method for detecting vibrations from a component, comprising:

mechanically transferring vibrations from the component to a membrane using a flexible connecting line;

using the membrane to convert the vibrations into acoustic waves that are transmitted through a medium; and using a microphone to detect the acoustic waves in the medium and to convert the acoustic waves into electrical signals.

12. The method of claim 11, wherein the method further comprises:

mechanically transferring vibrations from multiple components to the membrane using a separate flexible connecting line for each component;

using the membrane to convert the vibrations into acoustic waves that are transmitted through a medium; and using a microphone to detect the acoustic waves in the medium and to convert the acoustic waves into electrical signals.

13. The method of claim 12, wherein each connecting line has different mechanical coupling properties to facilitate converting the vibrations from the corresponding component into separately identifiable acoustic waves.

14. The method of claim 12, wherein the method further comprises bending and/or curving the connecting line while routing the connecting line between the component and the membrane.

15. The method of claim 14, wherein the method further comprises rerouting the connecting line if an object is placed in the connecting line's route.

16. The method of claim 11, wherein the medium includes air.

17. The method of claim 11, wherein the method further comprises enclosing the membrane, the microphone, and the medium in an acoustically insulated enclosure, wherein the acoustically insulated enclosure prevents external acoustic sources from being detected by the microphone.

18. The method of claim 11, wherein the method further comprises using a data acquisition system which is coupled to the microphone to analyze the electrical signals to determine the health of the component, wherein the electrical signals generated by the microphone are received by the data acquisition system.

19. The method of claim 11, wherein the component is at least one of:

a hard disk drive;

a chassis fan;

a power supply fan;

a processor fan; or any other device that produces vibrations during normal operation.

20. The method of claim 11, wherein the method further comprises adjusting a physical property of the membrane to adjust an amplitude of the acoustic waves generated by the membrane.

* * * * *